United States Patent [19]

Parsons

[11] Patent Number: 4,924,730
[45] Date of Patent: May 15, 1990

[54] TRANSMISSION SYSTEMS

[75] Inventor: Bryan N. V. Parsons, Stoney Stanton, England

[73] Assignee: Jaguar Cars Limited, United Kingdom

[21] Appl. No.: 230,787

[22] Filed: Aug. 10, 1988

[30] Foreign Application Priority Data

Aug. 25, 1987 [GB] United Kingdom ............... 8720051
Aug. 25, 1987 [GB] United Kingdom ............... 8720053

[51] Int. Cl.⁵ ............................................. F16H 15/50
[52] U.S. Cl. ................................. 475/166; 475/170; 74/199
[58] Field of Search ................. 74/796, 211, 199, 190, 74/793

[56] References Cited

U.S. PATENT DOCUMENTS 2,595,439 5/1952 Arato ........................ 74/199
3,151,717 10/1964 Kaptur et al. ............ 74/796 X
3,202,003 8/1965 Heintz ....................... 74/199
3,530,732 9/1970 Kashihara ................. 74/796 X
3,765,257 10/1973 Ogino ........................ 74/190 X
4,505,163 3/1985 Falkner ...................... 74/190 X

FOREIGN PATENT DOCUMENTS

WO80/02729 12/1980 World Int. Prop. O.
WO81/03367 11/1981 World Int. Prop. O.

Primary Examiner—Dwight G. Diehl
Assistant Examiner—Chris Campbell
Attorney, Agent, or Firm—Davis, Bujold & Streck

[57] ABSTRACT

A continuously variable transmission unit includes a disc drivingly connected to a first shaft, the disc having a frusto-conical groove in its outer periphery, the walls of the groove being inclined inwardly towards one another; an annular element is mounted for rotation about the disc, so that the inner periphery of the annular element is located within the groove, opposite faces of the annular element engaging the opposed walls of the groove. A connection is provided for transmitting rotation of the annular element to an output shaft and the annular element is mounted for rotation on a carrier, the carrier being adjustable radially of the disc to alter the eccentricity of the annular element with respect to the disc and to change the drive ratio of the transmission. The transmission unit may drive suitable gear trains to extend the range of drive ratios thereof. Positive drive elements may be included between the disc and annular element.

23 Claims, 7 Drawing Sheets

TRANSMISSION SYSTEMS

BACKGROUND OF THE INVENTION

The present invention relates to transmission systems and in particular to continuously variable transmission systems.

SUMMARY OF THE INVENTION

According to one aspect of the present invention a transmission system comprises; a disc drivingly connected to a first shaft, said disc having a frusto-conical groove in its outer periphery, the walls of the groove being inclined inwardly towards one another; an annular element mounted for rotation about the disc, so that the inner periphery of the annular element is located within the groove, opposite faces of the annular element engaging the opposed walls of the groove; means for moving the annular element eccentrically relative to the disc; and means for transmitting rotary motion of the annular element to a second shaft.

With this arrangement the disc may be connected to a rotational input and the annular element to a rotational output or vice versa. The drive ratio of the system will depend on the relative ratio of the radius of the inner periphery of the annular element and the radius of contact between the annular element and disc which in turn depends upon the eccentricity of the annular element relative to the disc.

According to one embodiment of the invention, rotary motion may be transmitted from the annular element by means of an outer disc, this outer disc having a frusto-conical groove in its inner periphery and being mounted coaxially of the inner disc, so that the outer periphery of the annular element is located between and engages the walls of the groove on the outer disc. As the annular element is moved eccentrically, the radius of contact with the outer disc will also vary so that there will be a further variation in the drive ratio depending upon the eccentricity of the annular element. Alternatively rotary motion may be transmitted directly from the annular element by means which will permit eccentric movement of the annular element relative to the disc, for example an Oldham coupling.

Drive in the above systems is transmitted by engagement of the peripheral edge of the annular element with the walls of the frusto-conical grooves. In order to ensure that these surfaces are maintained in driving engagement as the annular element is moved eccentrically of the disc or discs, the disc or discs may be formed from two parts, each part defining one of the walls of the grooves, the two parts being urged together, so that separation of the walls will vary with the eccentricity of the annular element in order to maintain appropriate driving engagement. Alternatively the annular element may be formed in two annular parts which are loaded outwardly relative to one another and into engagement with the walls of the groove or grooves. According to a further alternative the wall of the groove or grooves may be deformable to permit movement of the annular element while maintaining driving engagement.

The transmission system disclosed above will typically give a drive ratio of from 0.5 to 1. This system may be used to drive a driven element directly or may be connected via a suitable gear train to give drive ratios in excess of 1.

The system disclosed above may be arranged to give forward and reverse ratios by connection to an epicyclic gear train. In such an arrangement the disc engaging the inner periphery of the annular element is connected to an input shaft and to the annulus of the epicyclic gear train while the means for connecting the annular element to a second shaft drives the planet carrier. Taking the output from the sun gear this arrangement will typically provide drive ratios of from −0.5 to +1. Again this ratio may be increased to give forward ratios in excess of 1 by the addition of suitable gear trains on the output.

Alternatively, two traction element/epicyclic gear train units of the form described above may be connected with one traction element coupled directly to the other. The input would then be applied to the sun gear of one unit and the output would be taken from the sun gear of the other unit. With this arrangement, the traction element of the input unit may be controlled to give intermediate drive ratios of from 1 to infinity, which would then be applied to the output unit, the traction element of which may be controlled to provide reverse ratios and forward ratios of from zero to infinity.

According to a further embodiment of the invention the walls of said peripheral groove have a series of angularly spaced radially extending grooves and the inner periphery of the annular element is defined by a series of slats which are fixed angularly of the annular element but are free to move relative to the annular element and to one another parallel to the axis of rotation of the annular element, so that at the point of contact between the annular element and disc, the slats will engage in the radial grooves, whereby drive will be positively transmitted between the disc and the annular element.

The slats may be of fixed length extending the full width of the annular element. The disc is formed in two parts each defining one of the conical faces of the disc, the parts being slidably mounted on the shaft but located rotatively thereof so that the radial grooves on the conical face defined by one part are opposed to the lands between the radial grooves on the conical face defined by the other part. The two parts defining the disc are urged together, so that when they engage the periphery of the annular element, the lands on one part will shift the slats over and into engagement with the opposed radial groove on the other part and vice versa. As the engagement of the slats in the radial grooves provides positive drive, there is no need to use high loads to urge the parts of the disc together and only light spring pressure is required to maintain engagement of the slats with the wall of the peripheral groove as the annular element is moved eccentrically of the disc.

Alternatively the walls of the peripheral groove in the disc are fixed and the slats are spring loaded so that they extend outwardly from the faces of the annular element and into engagement with the radial grooves, the spring loading of the slats enabling them to accommodate the change in width between the walls of the peripheral groove as the annular element is moved eccentrically of the disc. With spring loaded slats of this form, control means is required to control the width of the slats to correspond to the width of the walls of the peripheral groove at the selected eccentricity.

BRIEF DESCRIPTION OF THE DRAWINGS

Various embodiments are now described, by way of example only, with reference to the accompanying drawings, in which.

DESCRIPTION OF PREFERRED EMBODIMENTS

Figure 1:
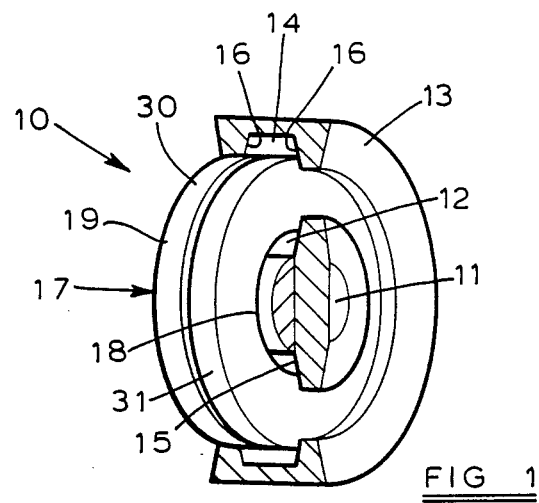
FIG. 1 is a schematic part-sectional view of a traction element used in a transmission system according to the present invention.

As illustrated in FIG. 1, a traction element 10 comprises a first disc 11 having a circumferential groove 12 around its outer periphery and a second disc 13 mounted concentrically of disc 11, this second disc 13 having a circumferential groove 14 around its inner periphery. The grooves 12 and 14 are identical in cross section, having walls 15, 16 respectively, which are inclined inwardly towards one another.

Figure 2:
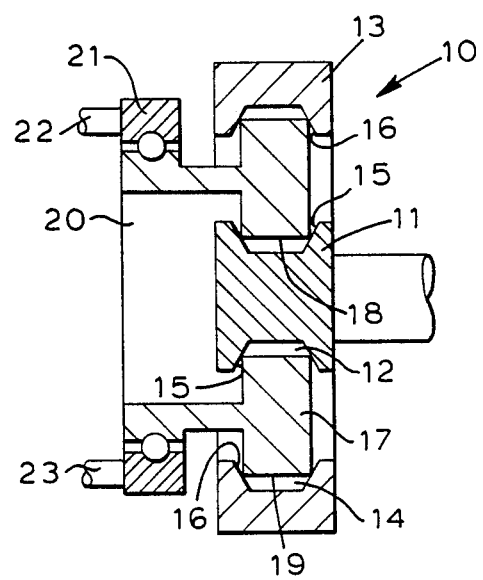
FIG. 2 illustrates one method of controlling the eccentricity of the annular element of the traction element illustrated in FIG. 1.

An annular element 17 is positioned between discs 11 and 13, so that its inner periphery 18 is positioned within groove 12 and its outer periphery 19 is positioned within groove 14. As illustrated in FIG. 2, an annular formation 20 is provided on one face of annular element 17, so that it will extend axially between the discs 11 and 13. This formation 20 defines one race of a bearing, the other race being defined by a carrier 21 which is positioned axially clear of the discs 11 and 13. The carrier 21 is pivotally mounted with respect to a fixed support element (not shown) about a pivot 22 and to a control mechanism (not shown) by pivot 23. The carrier 21 will thereby rotatably support the annular element 17, while permitting movement thereof eccentrically of the discs 11 and 13, by movement of pivot 23.

When the annular element 17 is positioned concentrically of discs 11 and 13, its inner periphery 18 will engage the walls 15 of groove 12 intermediate of their extremities, about its full circumference and likewise the outer periphery 19 will engage the walls 16 of groove 20 intermediate of their extremities, about its full circumference. The inner disc 11, annular element 17 and outer disc 13 will consequently rotate together at the same angular velocity.

Figure 3:
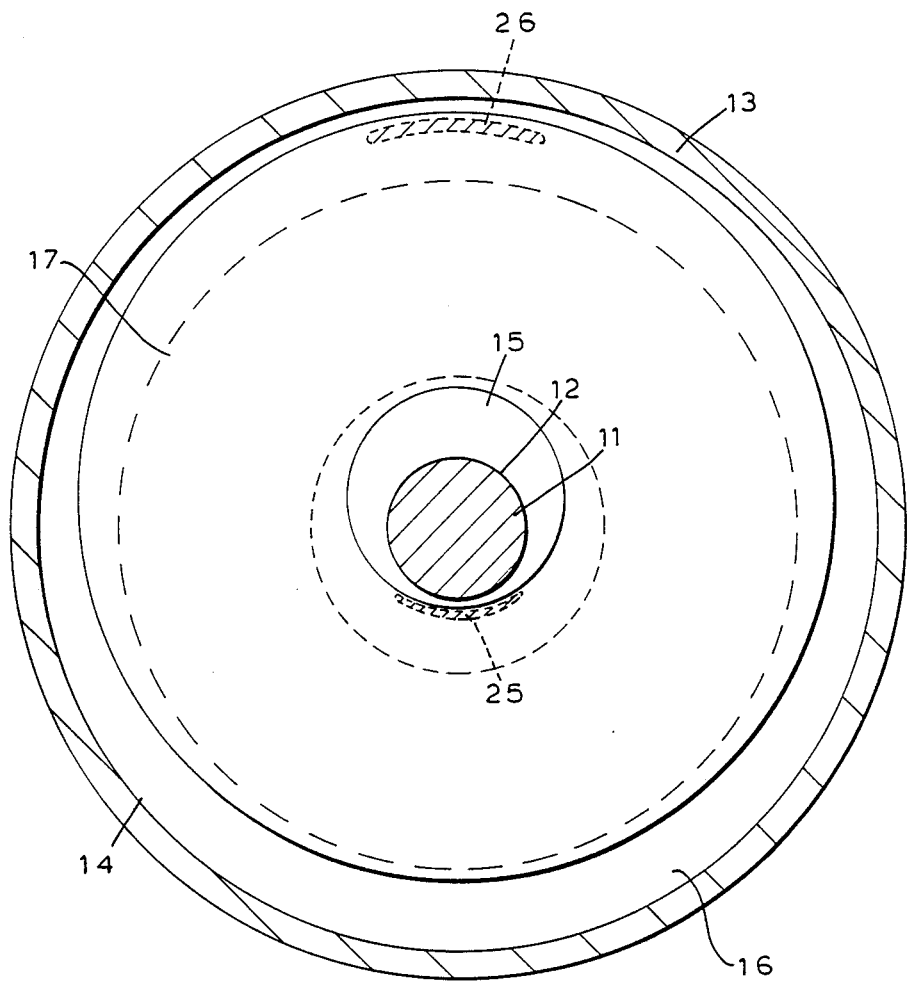
FIG. 3 illustrates the areas of contact between the annular element and inner and outer discs, when the annular element is eccentric to the discs, for the traction element illustrated in FIG. 1.

If the annular element 17 is moved so that it is eccentric of the discs 11 and 13, the point of contact between the inner periphery 18 and the walls 15 of groove 12, will move inwardly to provide a elliptical contact patch 25, as illustrated in FIG. 3. Similarly, the diametrically opposite outer peripheral portion of the annular element 17 will move outwardly and provide an elliptical contact patch 26 with the walls 16 of groove 14. The radius of contact between disc 11 and the inner periphery 18 of element 17 will consequently be smaller than the radius of the inner periphery 18 and consequently there will be a reduction in angular velocity when element 17 is driven by disc 11. Also, the radius of contact between element 17 and disc 13 will be greater than the radius of the outer periphery 19 and there will be a further reduction in angular velocity when disc 13 is driven by element 17.

In order to ensure that the annular element 17 is maintained in driving engagement with the walls 15 of groove 12 and walls 16 of groove 14, whatever the eccentricity, the annular element is formed from a pair of annular discs 30 and 31, with suitable sealing means therebetween, so that hydraulic fluid under pressure may be introduced into the gap between the discs 30 and 31, to force them apart and into engagement with the respective walls 15 and 16 of grooves 12 and 14. Alternatively, the annular element 17 may be formed from a single annular disc, the disc being sufficiently wide to drivingly engage walls 15 and 16 of grooves 12 and 14, when the element 17 is positioned concentrically of discs 11 and 13; the walls of the grooves being deformable to permit movement of element 17 eccentrically of the discs 11 and 13 while maintaining driving engagement.

If:
$R_1$ = Radius of the inner periphery 18 of the annular element 17;
$R_2$ = Radius of the outer periphery 19 of the annular element 7;
$e$ = Eccentricity of the annular element 17;
$W_1$ = Angular velocity of the inner disc 11; and
$W_2$ = Angular velocity of the outer disc 13;
Then the ratio $W_2/W_1 = R_2(R_1-e)/R_1(R_2+e)$ It can be seen that the ratio $W_2/W_1$ will always be less than 1, that is the inner disc will always rotate faster than the outer disc, when annular element 17 is eccentric of discs 11 and 13. Furthermore, there will be a limit on the maximum ratio, which will depend upon the radii $R_1$, $R_2$ and upon the depth of the grooves which places a restriction on the eccentricity $e$. Nevertheless, there is no difficulty in achieving speed ratios of from 1 to 0.5 by this means.

For a typical example:
$R_1 = 35$ mm
$R_2 = 70$ mm
$e = 0$ to 14 mm
Therefore:

$W_2/W_1$ = 1 when $e = 0$
= 0.5 when $e = 14$ mm

Figure 4:
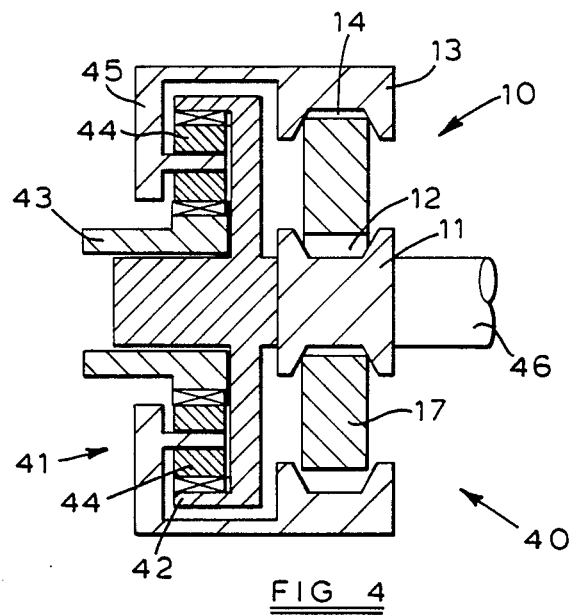
FIG. 4 illustrates a transmission unit incorporating the traction element illustrated in FIG. 1.

In the transmission 40 illustrated in FIG. 4, a traction element 10 as described above, is connected to an epicyclic gear train 41. The epicyclic gear train 41 comprises an annulus 42 and a sun gear 43 mounted coaxially of the annulus 42, with four planet gears 44 mounted therebetween.

The planet gears 44 are positioned symmetrically about the annulus 42 and sun gear 43 and are interconnected by a planet carrier 45. The inner disc 11 of traction element 10 is drivingly connected to the annulus 42 and the outer disc 13 is drivingly connected to the planet carrier 45. An input shaft 46 is drivingly connected to disc 11 and output is taken from the sun gear 43.

The drive ratio $V_1 V_2 = V_3/V_2(1+G) - G$

Where
$V_1$ = angular velocity of the sun gear 43;
$V_2 = W_1$ = angular velocity of the annulus 42;
$V_3 = W_2$ = angular velocity of the planet carrier 45;

$G = d_a/d_s$ = ratio of annulus to sun diameters
Therefore:

Drive ratio = $W_2/W_1(1+G) - G$

For the traction element 10 described above;
when $W_2/W_1 = 1$, the drive ratio = 1
also the drive ratio will be zero when $W_2/W_1(1+G) - G = 0$ therefore:

$W_2/W_1 = G/(1+G) = d_a/(d_s + d_a)$

As $d_a > d_s$:

$0.5 < W_2/W_1 < 1$

The drive ratio will consequently be zero at some value of $W_2/W_1$ between 1 and 0.5, this value depending on the ratio $d_a/d_s$.

For values $W_2/W_1 < d_a/(d_s + d_a)$ the drive ratio $V_1/V_2$ will be negative, thus indicating that the output is reversed.

In a typical example $G = \dfrac{\text{diameter of annulus}}{\text{diameter of sun gear}} = 2$ Thus the drive ratio = 1 when $W_2/W_1 = 1$
= 0 when $W_2/W_1 = 0.67$
= $-0.5$ when $W_2/W_1 = 0.5$ Consequently variation of the eccentricity of the annular element 17 between 0 and 14 mm will provide variation in the drive ratio of the transmission unit from 1 to 0 in the forward direction and from 0 to 0.5 in the reverse direction. Clearly the point at which the drive ratio is zero and consequently the maximum reverse ratio will depend on the ratio of diameters of the annulus and sun gears 42 and 43 which, within reason may be varied as required. This range of drive ratios may be increased by driving suitable gear trains from the sun gear 43, to give ratios in excess of 1.

Figure 5:
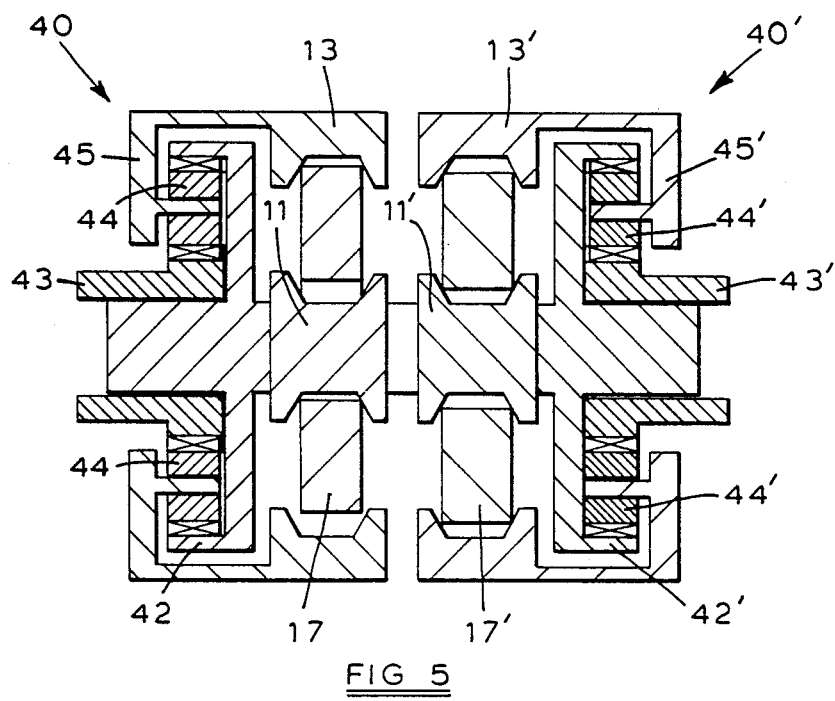
FIG. 5 illustrates a transmission system incorporating two transmission units as illustrated in FIG. 4.

In the transmission system illustrated in FIG. 5, two transmission units 40, 40' as shown in FIG. 4, are interconnected. The inner disc 11 of one unit 40 is connected to the inner disc 11' of the other unit 40'. With this system, the input is applied to the sun gear 43 of unit 40 and the output is taken from the sun gear 43' of unit 40'.

With this system, the traction element 10 of unit 40 may be controlled to provide drive ratios for unit 40 of from 1 to infinity.

That is for unit 40;

Drive ratio = $V_2/V_1 = 1/[W_2/W_1(1+G) - G]$

Therefore:

Drive ratio = 1 when $W_2/W_1 = 1$
= $\infty$ when $W_2/W_1 = G/(1+G)$

For the typical example given above:

Drive ratio = 1 when $W_2/W_1 = 1$
eccentricity = 0
= $\infty$ when $W_2/W_1 = 2/3$
eccentricity = 8.75 mm The output from unit 40 is then applied as an input to disc 11' of unit 40'. The traction element 10' of unit 40' may then be controlled to provide reverse and forward drive ratios as described with reference to FIG. 4.

By suitable control of the traction elements 10 and 10' this transmission system may thus be controlled to give overall ratios of from plus to minus infinity.

Figure 6:
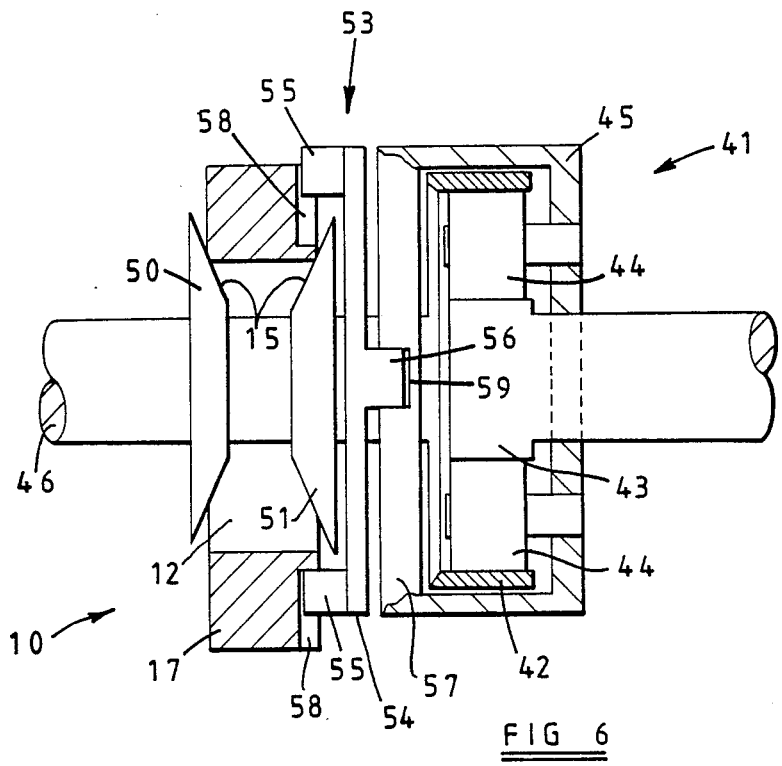
FIG. 6 illustrates in part sectional elevational an alternative transmission unit according to the present invention.

In the embodiment illustrated in FIG. 6 the traction element 10 comprises an inner disc formed from two elements 50 and 51, which are mounted on input shaft 46 and are loaded towards one another by means (not shown), for example hydraulic fluid means. Each of the elements 50 and 51 define one of the walls 15 of a frusto-conical groove 12.

The annular element 17 is located within the groove 12 and is movable eccentrically of disc elements 50, 51 in a manner similar to that of the embodiment illustrated in FIGS. 1 to 4. The annular element 17 is however drivingly connected to the planet carrier 45 by means of an Oldham coupling 53. The Oldham coupling 53 comprises an annular disk 54 having a pair of diametrically opposed lugs 55 on one face and a pair of diametrically opposed lugs 56 on the other face, the lugs 55 being disposed angularly of the disc 54 at 90 degrees to the lugs 56. The disc 54 is interposed between annular element 17 and a flange 57 on the planet carrier 45, lugs 55 engaging in a pair of diametrically opposed radial grooves 58 in annular element 17 and lugs 56 engaging in a pair of diametrically opposed radial grooves 59 in flange 57. The Oldham coupling 53 will thus transmit rotational motion from annular element 17 to planet carrier 45, while permitting eccentric movement of annular element relative to disc elements 50, 51.

With the traction element 10 of this embodiment:

The drive ratio $W_2/W_1 = (R_1 - e)/R_1$

Where
$R_1$ = radius of the inner periphery 18 of annular element 17;
e = eccentricity of annular element 17;
$W_1$ = Angular velocity of inner disc 11; and
$W_2$ = Angular velocity of annular element 17.

As with the embodiment illustrated in FIGS. 1 to 4 the ratio $W_1/W_2$ will always be less than one, when the annular element is eccentric of disc 11. While the drive ratio for a given eccentricity will be lower than that for the embodiment of FIGS. 1 to 4, drive ratios of from 1 to 0.5 may still be achieved. For example in a typical example.
$R_1 = 35$ mm
e = 0 to 17.5 mm Therefore $$W_2/W_1 = 1 \text{ when } e = 0$$
$$= 0.5 \text{ when } e = 17.5 \text{ mm}$$

As with the embodiment disclosed with reference to FIGS. 1 to 4 this drive ratio is extended to −0.5 to +1.0 by the epicyclic gear train 41 and may be extended still further by the addition of further gears or by interconnecting two such units in a manner similar to that illustrated in FIG. 5.

Figure 7:
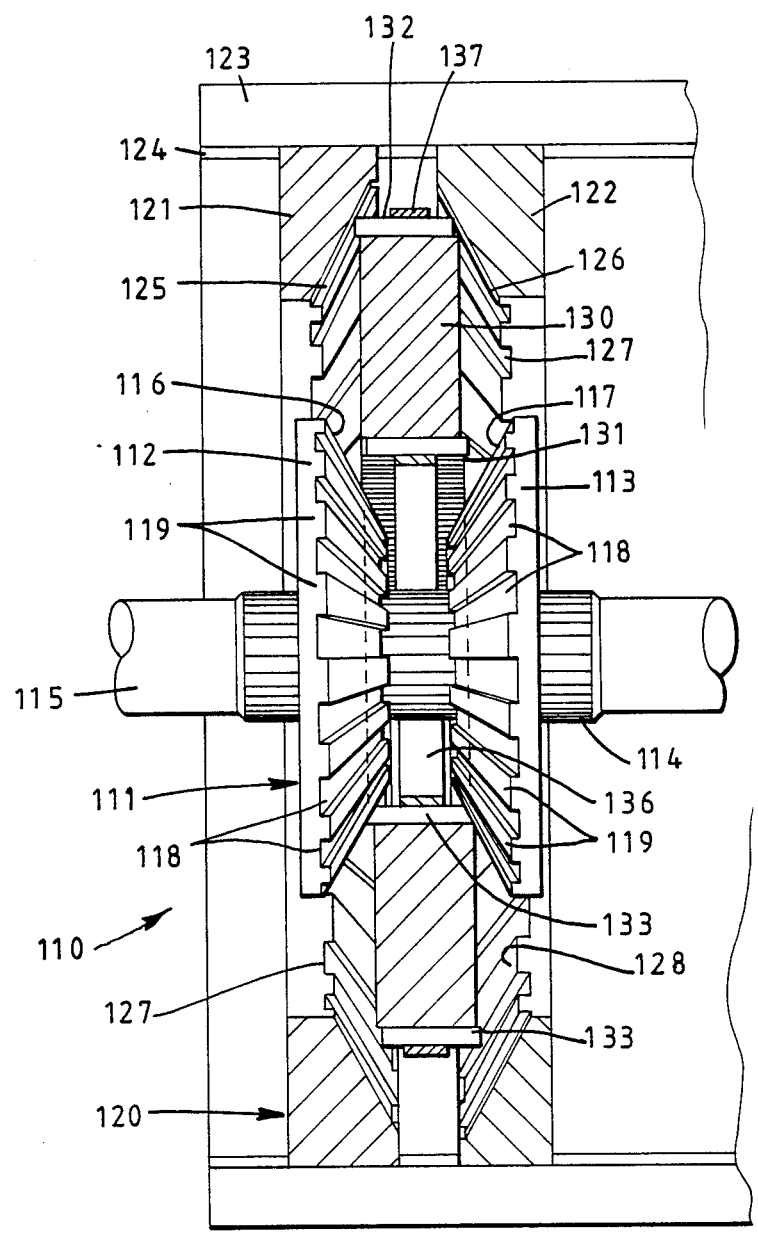
FIG. 7 is a part sectional side elevation of a modification to the traction element illustrated in FIG. 1.

In the modified traction element 110 illustrated in FIG. 7, an inner disc assembly 111 is formed from a pair of discs 112 and 113, which are slidably mounted on a splined portion 114 of shaft 115. The opposed faces 116 and 117 of disc 112 and 113 are of conical configuration, so that the discs define a frusto-conical outwardly opening peripheral groove therebetween. A series of angularly spaced radial grooves 118 are provided in each of the conical faces 116 and 117, the grooves 118 in one face 116 being aligned with the lands 119 between grooves 118 in the other face 117. The discs 112 and 113 are loaded axially towards one another by spring means (not shown).

An outer disc assembly 120 is mounted coaxially of disc assembly 111. The disc assembly 120 comprises a pair of annular discs 121 and 122 which are slidably mounted on an internally splined portion 124 of a ring member 123 which may be connected to an outlet shaft 30 via, for example, an epicyclic gear train, in a manner similar to that disclosed with reference to FIG. 4. As with the inner disc assembly 111, the opposed faces 125 and 126 of discs 121 and 122 are of conical configuration so that the discs 121 and 122 define an outwardly opening frusto-conical groove therebetween. A series of angularly spaced grooves 127 are provided in each of the conical faces 125 and 126, the grooves 127 in one face 125 being aligned with the lands 128 between the grooves 127 in the other face 126. The discs 121 and 122 are loaded axially relative to one another by spring means (not shown).

An annular element 130 is positioned between disc assemblies 111 and 120, so that its inner periphery 131 is positioned within the frusto-conical groove defined between discs 112 and 113 and its outer periphery 132 is positioned within the frusto-conical groove defined between discs 121 and 122. Means (not shown) is provided for movement of the annular element 130 eccentrically of the disc assemblies 111 and 120 and spring loading of the discs 112 and 113 and 121 and 122 ensures that the inner periphery 131 and outer periphery 132 of the annular element 130 are maintained in engagement with the conical faces of discs 116 and 117 and 121 and 122 respectively.

Figure 8:
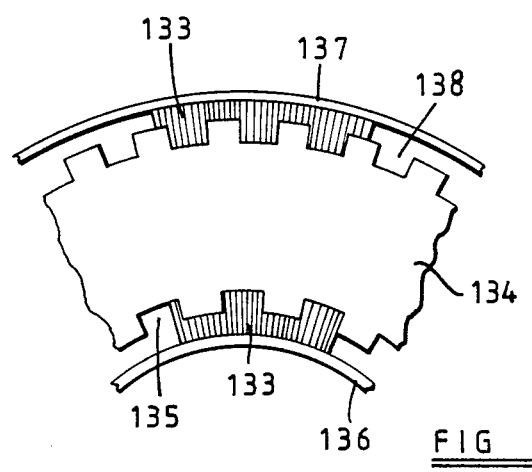
FIG. 8 is a side elevation of a segment of the annular element used in the traction element illustrated in FIG. 7.
Figure 9:
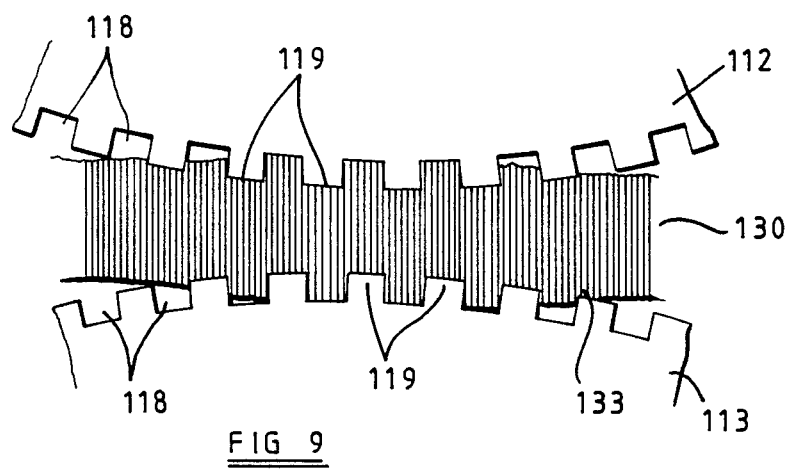
FIG. 9 is a section around the inner periphery of the annular element at the point of contact thereof with the inner disc, for the traction element illustrated in FIG. 7.

As illustrated in FIG. 8, the inner periphery 131 and outer periphery 132 of the annular element 130 are made up of a series of slats 133 which are arranged parallel to one another laterally of the annular element 130. The inner and outer peripheries of a support disc 134 have lateral grooves 135 and 138, and alternate groups of slats 133 engage in the grooves 135 and 138, so that the slats 133 are located angularly of the annular element 130. The slats 133 are however free to slide laterally of the annular element 130 and of one another. Rings 136 and 137 are provided about the inner and outer peripheries of the annular element 130, in order to retain the slats 133 radially of the annular element 130.

When the inner periphery 131 of annular element 130 is in engagement with the faces 116 and 117 of disc 112 and 113, as illustrated in FIG. 3, the lands 119 on one face will push the slats 133 into the radial grooves 118 on the other face 117 and vice versa, so that rotary motion will be transmitted positively between the disc assembly 111 and the annular element 130. In similar manner, the slats 133 in the outer periphery of annular element 130 will engage in the radial grooves 127 in faces 125 and 126 of the outer disc assembly 120, thus providing positive transmission of rotary motion between the annular element 130 and disc assembly 120.

Figure 10:
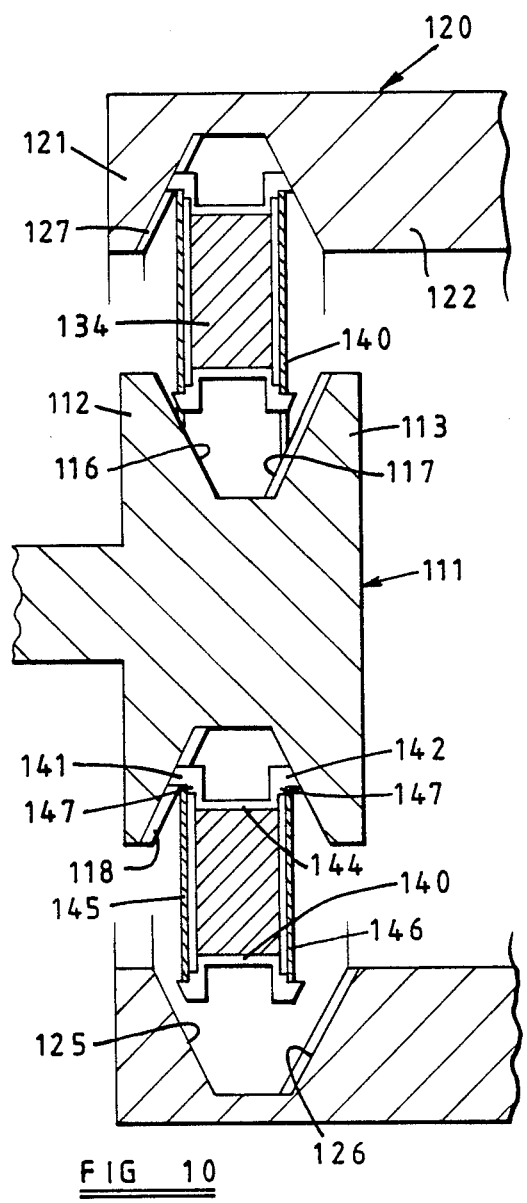
FIG. 10 is a sectional view of an alternative modification to the traction element illustrated in FIG. 1.

In the embodiment illustrated in FIG. 10, the discs 112 and 113 forming disc assembly 111 and discs 121 and 122 forming disc assembly 120 are in fixed axial relationship.

The portions 141 and 142 of slats 140, which engage in the radial grooves 118 and 127 in faces 116 and 117 and 125 and 126 respectively, extend outwardly from the support disc 134 so that they are capable of engaging opposed faces 116 and 117 and 125 and 126 at the widest separation as the annular element 130 is moved eccentrically of the disc assemblies 111 and 120. The portions 141 and 142 of slats 140 are interconnected by a resilient portion 144 which permits the portions 141 and 142 to be displaced inwardly towards one another, as the separation between the faces 116 and 117 and 125 and 126 decreases as the annular member is moved to engage narrow portions of the peripheral grooves defined between faces 116 and 117 and 125 and 126. In order to ensure that the appropriate contact patch is maintained and that the slats 140 do not maintain engagement outside this contact patch at narrower separations, annular control plates 145 and 146 abut formations 147 adjacent the outer ends of portions 141 and 142. These control plates run against the conical surfaces 116 and 117, and 125 and 126, at the point of contact thereof with the periphery of the annular element 130, in order to maintain appropriate separation of portions 141 and 142 of the slats 140.

With this embodiment, as the slats 140 come into engagement with the faces 116 and 117, and 125 and 126, they will be shifted laterally and into engagement with the radial grooves 118 and 127 as described with reference to FIG. 3.

Using positive drive elements as illustrated in FIGS. 7 to 10 will significantly reduce the loads that are required to maintain driving engagement between the inner and/or outer discs and the annular element.

I claim:
1. A transmission system comprising:
 a first shaft;
 a first disc mounted on said first shaft for rotation therewith, said first disc having a groove with frusto-conical walls, in its outer periphery;
 a second annular disc mounted concentrically of the first disc and having a groove with frusto-conical walls in its inner periphery;
 a second shaft drivingly connected to the second disc;
 an annular element mounted so that its inner periphery engages in the groove in the first disc at one radius and its outer periphery engages in the groove in the second disc at diametrically opposed positions on another radius;
 means for moving the annular element eccentrically relative to the first and second discs so that the radii at which the annular element engages the groove of each disc may be varied;

and means for maintaining the inner and outer peripheries of the annular element in driving engagement with the walls of the grooves in the first and second discs respectively.

2. A transmission system according to claim 1 in which the first disc is formed by two elements, each wall of the groove in the disc being defined by one of the elements, the elements defining the first disc being loaded towards one another and into engagement with the annular element.

3. A transmission system according to claim 1 in which said second disc is formed by two elements, each wall of the groove in the second disc being defined by one of the elements, the elements defining the second disc loaded towards one another and into engagement with the annular element.

4. A transmission system according to claim 1 in which an epicyclic gear train, comprising an annulus and a sun gear mounted coaxially of one another and a series of planet gears located symmetrically between the annulus and sun gears, the planet gears being interconnected by a planet carrier, is connected with the first disc via the annulus; and the second disc is drivingly connected to the planet carrier and an output being taken from the sun gear.

5. A transmission system according to claim 4 in which the annulus and sun gear have diameters of a ratio selected to provide forward and reverse ratios, for the forward ratios produced by the annular element.

6. A transmission system as claimed in claim 4, said transmission system including first and second epicyclic transmission units in which the first disc of the first unit is drivingly connected to the first disc of the second unit, the sun gear of the first unit being drivingly connected to a rotational input and an output being taken from the sun gear of the second unit.

7. A transmission system according to claim 6 in which the annular element of the first unit is controlled to give a forward ratio from 1 upwards and the annular element of the second unit is controlled to give reverse and forward ratios.

8. A transmission system according to claim 1 in which the walls of the peripheral groove of the first disc have a series of angularly spaced radially extending grooves and the inner periphery of the annular element is defined by a series of slats which are fixed angularly of the annular element but are free to move relative to the annular element and to one another parallel to an axis of rotation of the annular element, so that where the annular element engages the first disc the slats will engage in the radial grooves, whereby drive will be positively transmitted between the first disc and the annular element.

9. A transmission system according to claim 8 in which the walls of the peripheral groove of the second disc have a series of angularly spaced radially extending grooves and the outer periphery of the annular element being defined by a series of slats which are fixed angularly of the annular element but are free to move relative to the annular element and to one another parallel to the axis of rotation of the annular element, so that where the annular element engages the second disc, the slats will engage in the radial grooves, whereby drive will be positively transmitted between the annular element and the second disc.

10. A transmission system according to claim 9 in which the radial grooves are separated by lands, the radial grooves on one wall of the peripheral groove are opposed to the lands between radial grooves on the opposed wall, so that where the slats on the annular element engage the walls of the or each peripheral groove, the lands on one wall will shift the slats laterally into engagement with the radial grooves on the opposed wall and vice versa.

11. A transmission system according to claim 9 in which lateral grooves are provided in the periphery of an annular support element, alternate groups of slats being located in the lateral grooves with intermediate groups of slats being located between those groups located in the lateral groove, so that the slats are located angularly of the annular element.

12. A transmission system according to claim 9 in which the slats are of a fixed length, one of the first and second disc is formed in two parts, each part defining one of the walls of the peripheral groove, the parts defining one of the first and second disc being resiliently loaded axially towards one another so that they will maintain engagement with the opposite ends of the slats as the annular element is moved eccentrically of one of the first and second disc.

13. A transmission system according to claim 9 in which the walls of one of the first and second disc are fixed, the slats having radial groove engaging formations which are resiliently loaded away from one another so that they may be displaced laterally relative to one another to maintain engagement with the radial grooves at a contact point with one of the first and second disc, as the annular element is moved eccentrically of one of the first and second disc.

14. A transmission system according to claim 13 in which the control means is provided to control separation of the groove engaging formations of the slats to correspond to a width of the peripheral grooves at the radius engaged by the annular element.

15. A transmission system according to claim 14 in which a pair of annular control plates abut formations adjacent the outer ends of the radial groove engaging formations of the slats, the control plates engaging the walls of the peripheral groove at a point engaged therewith by the periphery of the annular element, in order to control separation of the groove engaging formations of the slats.

16. A transmission system according to claim 8 in which the radial grooves are separated by lands, the radial grooves on one wall of the peripheral groove are opposed to the lands between radial grooves on the opposed wall, so that where the slats on the annular element engage the walls of the or each peripheral groove, the lands on one wall will shift the slats laterally into engagement with the radial grooves on the opposed wall and vice versa.

17. A transmission system according to claim 8 in which lateral grooves are provided in the periphery of an annular support element, alternate groups of slats being located in the lateral grooves with intermediate groups of slats being located between those groups located in the lateral groove, so that the slats are located angularly of the annular element.

18. A transmission system according to claim 8 in which the slats are of a fixed length, one of the first and second disc is formed in two parts, each part defining one of the walls of the peripheral groove, the parts defining one of the first and second disc being resiliently loaded axially towards one another so that they will maintain engagement with the opposite ends of the slats as the annular element is moved eccentrically of one of the first and second disc.

19. A transmission system according to claim 8 in which the walls of one of the first and second disc are fixed, the slats having radial groove engaging formations which are resiliently loaded away from one another so that they may be displaced laterally relative to one another to maintain engagement with the radial grooves at a contact point with one of the first and second disc, as the annular element is moved eccentrically of one of the first and second disc.

20. A transmission system according to claim 19 in which control means is provided to control separation of the groove engaging formations of the slats to correspond to a width of the peripheral grooves at the radius engaged by the annular element.

21. A transmission system according to claim 20 in which a pair of annular control plates abut formations adjacent the outer ends of the radial groove engaging formations of the slats, the control plates engaging the walls of the peripheral groove at a point engaged therewith by the periphery of the annular element, in order to control separation of the groove engaging formations of the slats.

22. A transmission system according to claim 21 in which the first and second discs are each formed in one piece, the annular element being formed from a pair of discs with means to urge the discs apart and into driving engagement with the walls of the grooves in the first and second discs.

23. A transmission system according to claim 1 in which the annular element is rotatably mounted to a carrier, the carrier being attached at one point to a support element by means of a pivot, means being provided for movement of the carrier about said pivot, so as to move the annular element eccentrically of the inner and outer discs.

* * * * *

UNITED STATES PATENT AND TRADEMARK OFFICE
CERTIFICATE OF CORRECTION

PATENT NO. : 4,924,730

DATED : May 15, 1990

INVENTOR(S) : Bryan Nigel Victor PARSONS

It is certified that error appears in the above—identified patent and that said Letters Patent is hereby corrected as shown below:

Column 12, line 6 - change "21" to --1--.

Signed and Sealed this

Sixteenth Day of July, 1991

Attest:

HARRY F. MANBECK, JR.

Attesting Officer

Commissioner of Patents and Trademarks